United States Patent [19]
Müller et al.

[11] Patent Number: 4,770,562
[45] Date of Patent: Sep. 13, 1988

[54] METHOD OF SALVAGING A PIPE CONDUIT BURIED UNDER GROUND

[75] Inventors: Hans Müller, Brauergildestrasse 5, 4938 Schieder-Schwalenberg; Hermann Suerbaum, Schieder-Schwalenberg/Lothe, both of Fed. Rep. of Germany

[73] Assignee: Hans Müller, Schieder-Schwalenberg, Fed. Rep. of Germany

[21] Appl. No.: 921,321

[22] Filed: Oct. 17, 1986

[51] Int. Cl.$^4$ .............................................. F16L 55/16
[52] U.S. Cl. ..................................... 405/154; 138/97; 156/287; 156/294; 405/150
[58] Field of Search ............... 405/146, 150, 155, 156; 156/294, 287; 138/97

[56] References Cited

U.S. PATENT DOCUMENTS

| | | | |
|---|---|---|---|
| 3,422,631 | 1/1969 | Silverman | 405/155 |
| 3,494,813 | 2/1970 | Lawrence et al. | 405/150 X |
| 4,009,063 | 2/1977 | Wood | 405/150 X |
| 4,350,548 | 9/1982 | Zenbayashi et al. | 405/150 X |
| 4,456,401 | 6/1984 | Williams | 405/146 X |
| 4,668,125 | 5/1987 | Long | 405/150 X |

FOREIGN PATENT DOCUMENTS 2362784 6/1982 Fed. Rep. of Germany.
2240153 2/1986 Fed. Rep. of Germany.

*Primary Examiner*—Dennis L. Taylor
*Attorney, Agent, or Firm*—Erwin S. Teltscher

[57] ABSTRACT

A method of salvaging a pipe conduit which has a predetermined inner diameter and is buried under ground, especially a sewer pipe includes the steps of soaking a resin-absorbing inner layer of a lining hose which further includes an impermeable outer layer that outwardly adjoins and surrounds the inner layer and has an outer diameter which is slightly smaller than the inner diameter of the pipe conduit to be salvaged with an amount of a resin that exceeds that needed for saturating the inner layer. The outer layer is perforated to form a plurality of flow-through openings for the resin therein. The lining hose is subsequently introduced in its collapsed state into the pipe conduit. Finally, the lining hose is shaped to conformingly line the pipe conduit by causing a fluid to flow at a superatmospheric pressure into an auxiliary hose at least partially received in the lining hose and including a turned-over region with attendant gradual advancement of the turned-over region of the auxiliary hose into the lining hose and escape of the excess amount of the resin through the flow-through openings.

6 Claims, 3 Drawing Sheets

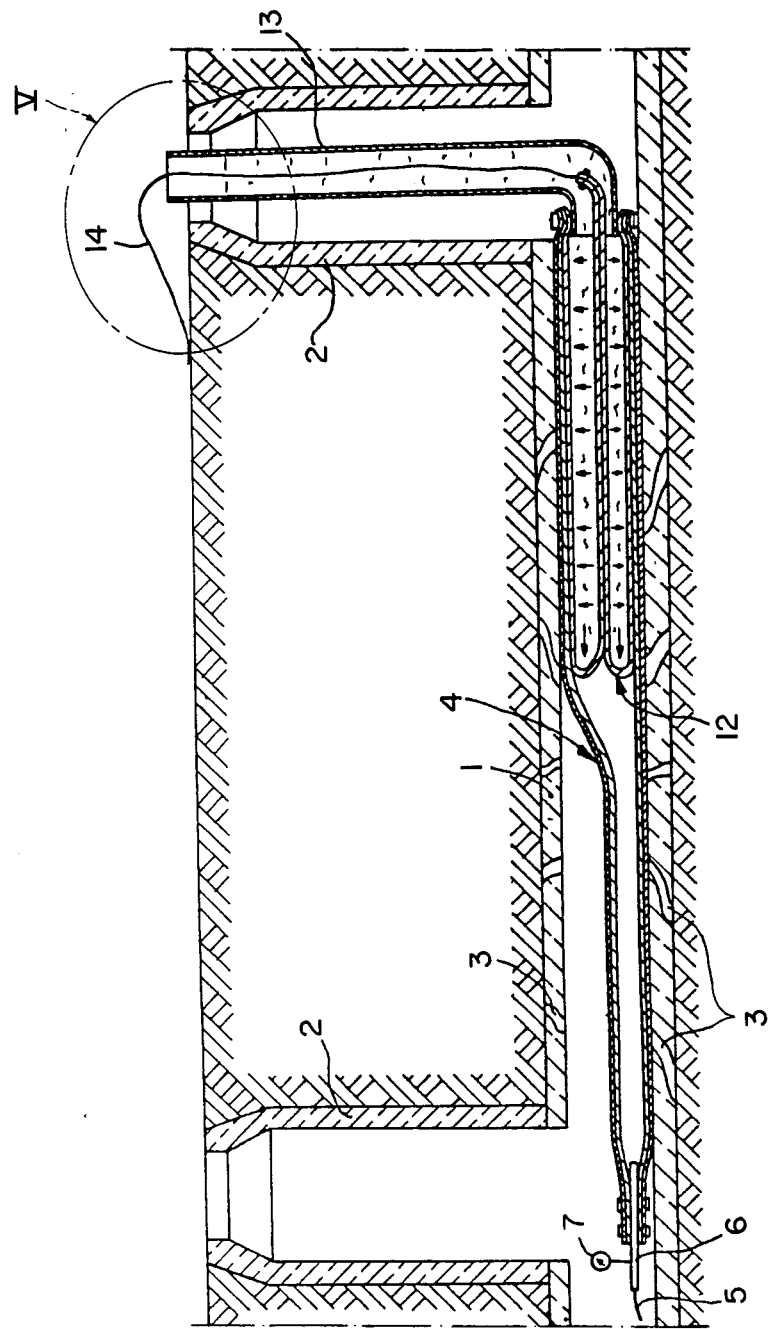

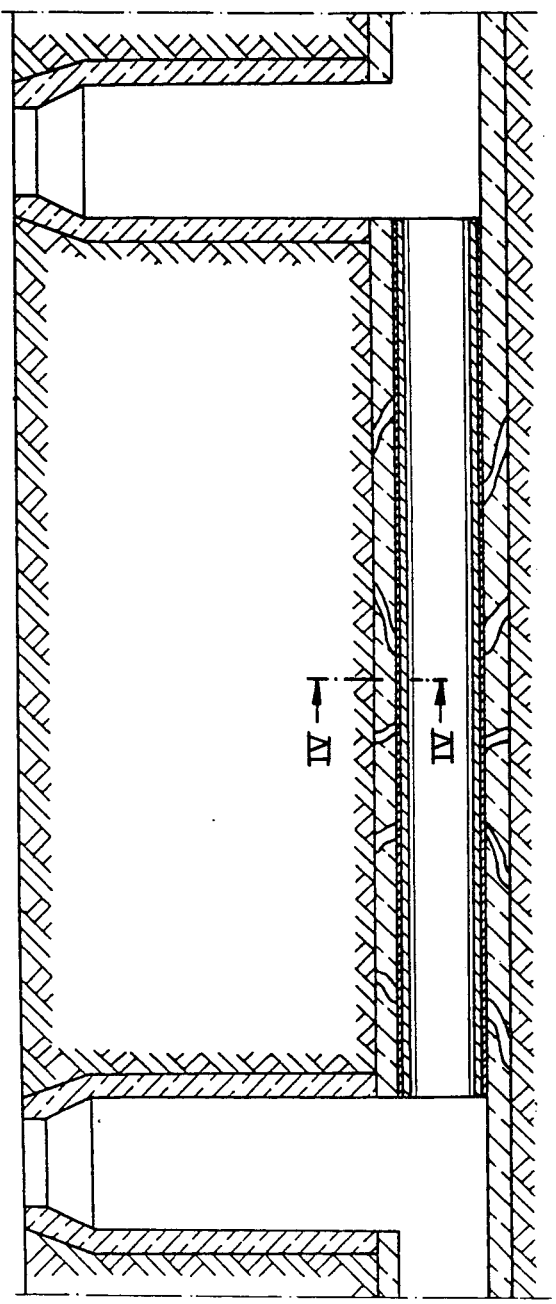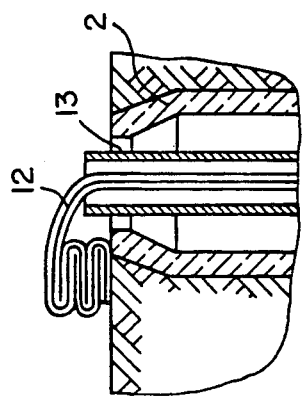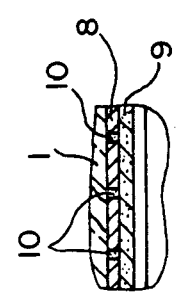

METHOD OF SALVAGING A PIPE CONDUIT BURIED UNDER GROUND

BACKGROUND OF THE INVENTION

The present invention relates to pipe conduits in general, and more particularly to a method of salvaging or restoring to use a pipe conduit which has suffered damage.

There are already known various methods of salvaging a pipe conduit which is buried under ground, especially of a sewage or waste water channel. Generally speaking, such methods include the use of a lining hose having a diameter which is slightly smaller than the inner diameter of the pipe conduit to be salvaged. This lining hose frequently includes an impermeable layer and an adjacent resin-absorbing layer. This resin-absorbing layer is soaked or permeated with a resin prior to the introduction of the thus treated lining hose into the pipe conduit. The lining hose is introduced into the pipe conduit in its collapsed state by means of a rope or cable and a winch. After being properly positioned in the pipe conduit, the liming hose is pressed against the inner surface of the pipe conduit by a pressurized medium.

One method of this kind is known from the German patent DE-PS No. 22 40 153. This method employs a lining hose which is provided with the impermeable layer at its exterior. The alleged purpose of this impermeable outer layer is to avoid the need for preceding cleaning of the pipe conduit. However, it was established by experience that a thorough cleaning is necessary, inasmuch as deposits are always present in an old pipe conduit, and these deposits often occupy a considerable part of the flow-through cross-sectional area of the pipe conduit.

Since a connection of the lining with the inner surface of the pipe conduit cannot take place through the impermeable outer layer, leaky locations, such as cracks or fissures in the pipe conduit or damaged pipe connections, are not sealed, so that ground water which penetrates from the ground into the pipe conduit through such leaky locations collects in the annular space present between the inner surface of the pipe conduit and the outer surface of the lining. Also, the securing of the lining in the pipe conduit against displacement in the axial direction of the pipe conduit cannot be achieved in this construction. This lining is provided with a resin-impermeable layer even at its inner surface.

There is further known, from the German patent DE-PS No. 23 62 784, a method in accordance with which the lining hose which is introduced into the pipe conduit to be salvaged is provided with the resin-impermeable layer at its inner region, and with the resin-soaked layer at its outer region. This lining hose is introduced into the interior of the pipe conduit by turning over one end region thereof and by causing the turned-over region to gradually advance into the interior of the pipe conduit. During the performance of this last-mentioned step, the resin-soaked layer, which is originally located at the interior, is gradually transferred to the exterior of the lining hose. Relatively high forces are needed for the gradual turning-over of the lining hose, owing to the fulling work to be performed at the turned-over region. Inasmuch as the lining hose is being turned over at the turning-over region with a relatively small radius, it is not possible to use a glass fiber reinforced lining hose.

Formation of folds or creases cannot be prevented when using these two known methods during the introduction of the lining hose into arcuate portions of the pipe conduit or into pipe conduit regions including positional shifting between axially successive pipe conduit sections. Yet, such folds or creases adversely affect the flow-through cross-sectional area, promote the formation of deposits, and their shapes are stabilized by the hardened resin. Such folds or creases must then be removed by a milling apparatus which moves through the lined pipe conduit. Inasmuch as the lining is damaged by this milling operation, an additional hose is subsequently introduced into the interior of the lined pipe conduit and is adhesively connected with the lining.

SUMMARY OF THE INVENTION

Accordingly, it is a general object of the present invention to avoid the disadvantages of the prior art.

More particularly, it is an object of the present invention to provide a method of salvaging damaged pipe conduits, which does not possess the drawbacks of the known methods of this type.

Still another object of the present invention is to devise a method of the type here under consideration which achieves a secure connection between the lining hose and the pipe conduit.

It is yet another object of the present invention to develop the above method in such a manner that a smooth inner surface of the lining is achieved even when folds or creases form in the lining hose.

A concomitant object of the present invention is so to make the method of the above type relatively simple, inexpensive, and easy to use.

In keeping with these objects and others which will become apparent hereafter, one feature of the present invention resides in a method of salvaging a pipe conduit which has a predetermined inner diameter and is buried under ground, especially a sewer pipe. This method includes the steps of soaking a resin-absorbing inner layer of a lining hose, which further includes an impermeable outer layer that outwardly adjoins and surrounds the inner layer and has an outer diameter which is slightly smaller than the inner diameter of the pipe conduit to be salvaged, with an amount of a resin that exceeds that needed for saturating the inner layer, and perforating the outer layer to form a plurality of flow-through openings for the resin in the outer layer. The lining hose is subsequently introduced in its collapsed state into the pipe conduit, and the lining hose is shaped to conformingly line the pipe conduit. The shaping of the lining hose includes causing a fluid to flow at a superatmospheric pressure into an auxiliary hose which is at least partially received in the lining hose and includes a turned-over region with attendant gradual advancement of the turned-over region of the lining hose into the auxiliary hose and escape of the excess amount of the resin through the flow-through openings. Advantageously, the introducing step includes pulling the auxiliary hose into the pipe conduit by an elongated flexible element and a winch.

Inasmuch as the outer covering layer of the lining hose is provided with flow-through openings for the flow of the resin therethrough, and the inner layer of the lining hose is constituted by the resin-absorbing layer which is permeated by the amount of the resin which is excessive for merely saturating the inner layer, the excess resin is caused to flow by the pressure exerted on the lining hose by the auxiliary hose onto the external surface of the covering layer and into the vicinity of the turned-over region of the auxiliary hose. In the event that the lining hose forms a folds or crease which protrudes into the flow-through cross-sectional area of the lining hose, such fold or crease is returned back or ironed out by the action of the auxiliary hose. Any hollow spaces which remain at the fold or crease regions are filled by the resin which is being transported or displaced by the auxiliary hose, so that the inner surface of the lining obtains a smooth contour.

In order to provide a lining with a high strength, it is proposed according to an advantageous aspect of the present invention for the inner layer to include or be constituted by a glass fiber reinforced material.

It is also advantageous for the method to further comprise the step of removing air from the interior of the lining hose during the shaping step.

BRIEF DESCRIPTION OF THE DRAWING

The present invention will be described below in more detail with reference to the accompanying drawing in which:

FIG. 2 is a view similar to FIG. 1 but during the advancement of a turned-over region of an auxiliary hose into the lining hose;

FIG. 3 is a view similar to FIG. 1 but after the shaping of the lining hose;

FIG. 4 is a partial sectional view taken along the line IV—IV of FIG. 3; and

FIG. 5 is a view of a detail V of FIG. 2 but at an earlier stage of the advancement of the auxiliary hose.

DETAILED DESCRIPTION OF THE PREFERRED EMBODIMENT

Figure 1:
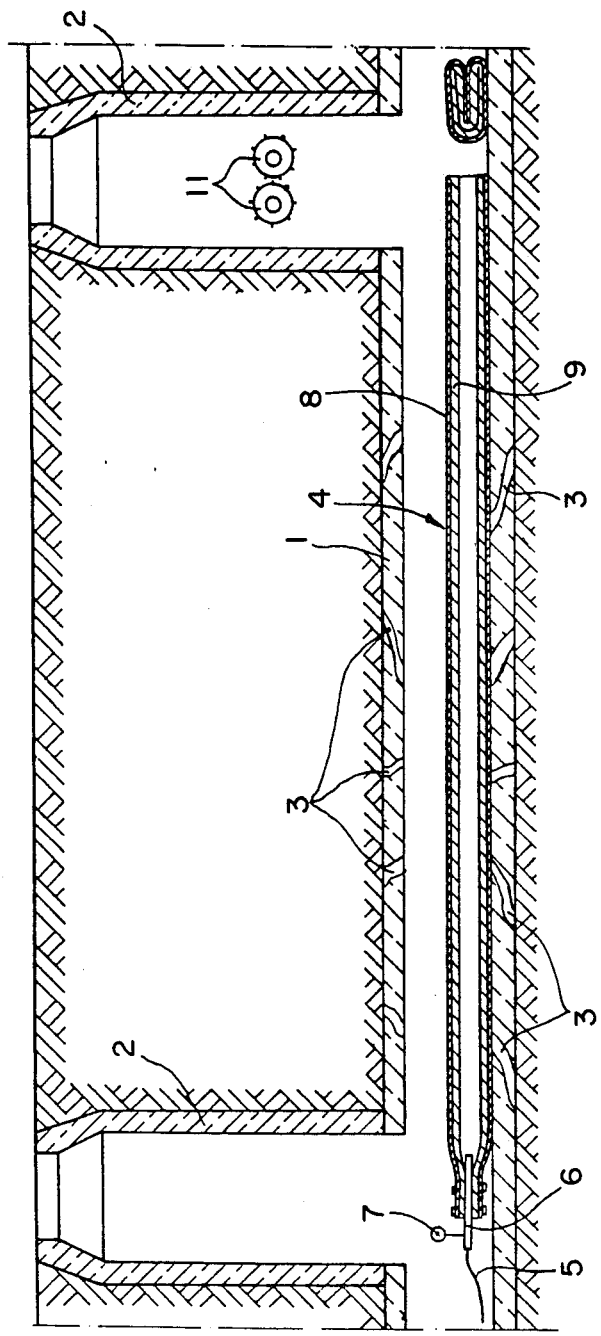
FIG. 1 is a longitudinal sectional view of a pipe conduit section located between two control shafts with a lining hose received therein in its collapsed state.

Referring now to the drawing in detail, and first to FIG. 1 thereof, it may be seen that the reference numeral 1 has been used therein to identify a pipe conduit which is buried under ground. The pipe conduit 1 is provided with control shafts 2 which lead to the surface. In FIGS. 1 to 3, there is illustrated basically only a section of the pipe conduit 1 which is situated between two of the control shafts 2. The pipe conduit 1 includes, for instance, a plurality of cracks or fissures 3.

A lining hose 4 is shown to be already received in the interior of the section of the pipe conduit 1 which is situated between the two aforementioned control shafts 2, having been pulled into the illustrated position in its flattened or collapsed state by means of a rope or cable 5 and a non-illustrated winch. The free end of the rope or cable 5 and the adjacently disposed end of the lining hose 4 are secured to a pulling member 6 which is provided with a non-illustrated air outlet channel which is in communication with an outlet valve 7. The pulling of a tube or of a hose into a pipe section is generally known in the affected branch of technology.

The lining hose 4 consists of an outer covering layer 8 and of an inwardly adjacent inner layer 9 which is made of a material capable of absorbing a resin. In the position of the lining hose 4 which is illustrated in FIG. 1 of the drawing, the inner layer 9 is already soaked with the resin. The lining hose 4 can be made, for example, of a non-woven fibrous material or fleece which is provided with an external coating of a synthetic plastic material, such as, for example, polyurethane. From FIG. 1, there may further be seen the shape of the lining hose 4. As illustrated therein, one side of the lining hose 4 is folded over inwardly in the form of a lateral fold. In a non-illustrated manner, a body of water could be introduced into the previously cleaned pipe conduit 1, to such a level the lining hose 4 rests with its width on this body of water. As may be ascertained from FIG. 4 of the drawing, the outer covering layer 8 is provided with flow-through openings 10. These openings 10 are pierced into the outer covering layer 8 during the introduction of the lining hose 4 into the pipe conduit 1 by means of perforating rollers 11 which are shown in FIG. 1 of the drawing and which are provided with outwardly projecting needles. The perforating rollers 11 constitute components of an otherwise non-illustrated auxiliary apparatus which, in the presented exemplary embodiment, is so constructed that the perforating rollers 11 are disposed at the lower end of that one of the control shafts 2 through which the lining hose 4 is being pulled into the respective section of the pipe conduit 1. The introduction of the resin may be performed directly at the building site, but it may also be accomplished externally. However, in each instance, the introduction of the resin takes place prior to the perforation or piercing of the outer covering layer 8 of the lining hose 4.

The introduction of an auxiliary hose 12 into the lining hose 4 situated in the above-mentioned section of the pipe conduit 1 is illustrated in FIG. 2 of the drawing. An inversion pipe 13, which has the configuration of a tubular elbow the length of the vertical leg of which, however, is accommodated to the height or depth of the right-hand control shaft 2 as considered in the drawing, is introduced in this control shaft 2. A forward, free end of the auxiliary hose 12 and the associated end of the lining hose 4 are attached to the horizontally extending portion of the inversion pipe 13. In the illustrated construction, only the connecting end of the initially flat auxiliary hose 11 was originally turned over outwardly. As a result of introduction of water into the inversion pipe 13, and in dependence on the attendant pressure buildup, the auxiliary hose 12 is expanded by the water entering the same from the inversion pipe 13 and, at the same time, the region of turning over of the auxiliary hose 12 becomes gradually and progressively displaced away from the region of attachment of the hoses 4 and 12 to the inversion pipe 13. For keeping the pressure constant, it is merely necessary to maintain the height of the water column contained in the inversion pipe 13 constant.

As indicated by arrows in the already turned-over or inverted portion of the auxiliary hose 12, the pressure exerted by the water present in the auxiliary hose 12 is directed against the instantaneous leading end of the auxiliary hose 12 and also perpendicularly against the internal surface of the auxiliary hose 12. In this manner, the lining hose 4 is shaped, expanded, and pressed against the internal surface of the aforementioned section of the pipe conduit 1. Any excessive amount of the resin which is contained in the inner layer 9 of the lining hose 4 is pressed by the pressure exerted on the auxiliary hose 4 by the auxiliary hose 12 and thus mediately by the water contained in the auxiliary hose 12 through the flow-through openings 10 of the outer covering layer 8 and it forms a film for the connection of the lining hose 4 to the internal surface of the above section of the pipe conduit 1. In addition thereto, if a sufficient amount of the resin is present in the inner layer 9 of the auxiliary hose 4, any additional excessive amounts of such resin are caused to flow into the cracks or fissures 3.

After the lining hose 4 has been fully shaped, the resin is hardened, for instance, by exposing the same to heat. Accordingly, the lining hose 4 is to be considered in the sense of constituting a pipe which is drawn or pulled into the pipe conduit 1 and which is, moreover, rigidly connected with the original pipe conduit 1. This is the situation shown in FIG. 3 of the drawing. In the event that the auxiliary hose 12 is to remain in the lining hose 4, the ends thereof are cut off. However, it is also contemplated to provide for the removal of the auxiliary hose 12 from the lining hose 4. To this end, an auxiliary rope or cable 14 is connected to the free, trailing end of the auxiliary hose 12, as may be seen in FIG. 2, and the auxiliary hose 12 may be withdrawn from the interior of the lining hose 4 after the lining hose 4 has been shaped, by pulling on the auxiliary rope or cable 14. Moreover, this auxiliary rope or cable 14 may also be used for controlling the forward progress of the auxiliary hose 14 under the influence of the pressure of the water entering the interior of the auxiliary hose 14 through the inversion pipe 13, by retarding such progress by braking the advancement of the auxiliary rope or cable into the inversion pipe 13.

The outlet valve 7 which is arranged at the end of the lining hose 4 that is remote from the inversion pipe 13 is operative for letting air present in the interior of the lining pipe 4 escape as the turned-over region of the auxiliary pipe advances through the interior of the lining pipe 4 when the pressure of such confined air exceeds the pressure at which the outlet valve 7 opens.

The flow-through openings 10 are indicated in FIG. 4 to be cylindrical bores. However, it is to be understood that these openings 10 can have other, for instance slot-shaped, configurations as well.

It may be ascertained from FIG. 5 that the auxiliary hose 12 is interfolded for its transportation and introduction into the lining hose 4 in an accordion-like fashion. Then, during the gradual progress of the turned-over region of the auxiliary hose 12 into the lining hose 4, the successive folds of the auxiliary hose 12 are removed one after another from the surface on which the interfolded auxiliary hose 12 is supported.

While the present invention has been described and illustrated herein as embodied in a method restoring a specific construction of a pipe conduit to use, it is not limited to the details of this particular construction, since various modifications and structural changes are possible and contemplated by the present invention. Thus, the scope of the present invention will be determined exclusively by the appended claims.

What is claimed is:

1. A method of salvaging a pipe conduit which has a predetermined inner diameter and is buried under ground, especially a sewer pipe, comprising the steps of
   soaking a resin-absorbing inner layer of a lining hose, which further includes an impermeable outer layer that outwardly adjoins and surrounds the inner layer and has an outer diameter which is slightly smaller than the inner diameter of the pipe conduit to be salvaged, with an amount of a resin that exceeds that needed for saturating the inner layer;
   perforating the outer layer to form a plurality of flow-through openings for the resin therein;
   subsequently introducing the lining hose in a collapsed state thereof into the pipe conduit; and
   shaping the lining hose to conformingly line the pipe conduit, including causing a fluid to flow at a superatmospheric pressure into an auxiliary hose at least partially received in the lining hose and including a turned-over region with attendant gradual advancement of the turned-over region of the auxiliary hose into the lining hose and escape of the excess amount of the resin through the flow-through openings.

2. The method as defined in claim 1, wherein said introducing step includes pulling the auxiliary hose into the pipe conduit by an elongated flexible element and a winch.

3. The method as defined in claim 1, and further comprising the step of removing air from the interior of the lining hose during said shaping step.

4. The method as defined in claim 1, wherein said soaking step includes soaking the resin-absorbing layer which includes a glass fiber reinforced material.

5. The method as defined in claim 1, and further comprising the step of hardening the resin after the escape through the through-flow openings of the outer layer.

6. The method as defined in claim 5, and further comprising the step of withdrawing the auxiliary hose from the lining hose by pulling means after the hardening of the resin.

* * * * *